United States Patent
Ashcraft et al.

(10) Patent No.: US 6,470,268 B1
(45) Date of Patent: Oct. 22, 2002

(54) NAVIGATION DESTINATION ENTRY VIA GLYPH TO DIGITAL TRANSLATION

(75) Inventors: Paul D. Ashcraft, Campbell; James Nolan, Boulder Creek, both of CA (US); John R. Angerman, Livonia; Stanley J. Tracy, Bloomfield, both of MI (US)

(73) Assignee: Horizon Navigation, Inc., Santa Clara, CA (US)

( * ) Notice: Subject to any disclaimer, the term of this patent is extended or adjusted under 35 U.S.C. 154(b) by 0 days.

(21) Appl. No.: 09/929,893

(22) Filed: Aug. 14, 2001

(51) Int. Cl.⁷ ............................................. G01C 21/30
(52) U.S. Cl. .................. 701/209; 701/25; 701/28; 701/209; 701/211; 701/214; 340/988
(58) Field of Search ..................... 701/25, 26, 28, 701/33, 209, 211, 212, 214; 340/988, 990

(56) References Cited

U.S. PATENT DOCUMENTS

| | | |
|---|---|---|
| 5,243,529 A | 9/1993 | Kashiwazaki |
| 5,283,575 A | 2/1994 | Kao et al. |
| 5,291,412 A | 3/1994 | Tamai et al. |
| 5,291,413 A | 3/1994 | Tamai et al. |
| 5,303,159 A | 4/1994 | Tamai et al. |
| 5,311,434 A | 5/1994 | Tamai |
| 5,406,491 A * | 4/1995 | Lima ......................... 701/210 |
| 5,414,630 A | 5/1995 | Oshizawa et al. |
| 5,430,655 A | 7/1995 | Adachi |
| 5,544,061 A | 8/1996 | Morimoto et al. |
| 5,596,500 A | 1/1997 | Sprague et al. |
| 5,654,908 A | 8/1997 | Yokoyama |
| 5,724,243 A | 3/1998 | Westerlage et al. |
| 5,938,710 A * | 8/1999 | Lanza et al. .................. 701/50 |
| 6,088,648 A | 7/2000 | Shah et al. |
| 6,091,505 A * | 7/2000 | Beaman et al. ............ 358/1.11 |

* cited by examiner

*Primary Examiner*—Gertrude Arthur
(74) *Attorney, Agent, or Firm*—Brinks Hofer Gilson & Lione; Daniel B. Schein, Esq.

(57) ABSTRACT

A system and method for receiving and storing location information and providing navigational information to facilitate travel to a desired location is disclosed. Geographic location information is entered into the system, and a two dimensional representation of information, or glyph, is output that contains navigational information. For example, longitude and latitude information for a delivery address can be translated into a bar code. The bar code can be scanned by a portable bar code reader by a delivery person for the secure transfer of delivery address information.

21 Claims, 3 Drawing Sheets

*Code 128*

*Code 39*

NAVIGATION DESTINATION ENTRY VIA GLYPH TO DIGITAL TRANSLATION

FIELD OF THE INVENTION

This invention relates generally to the field of geographical information systems and navigation methods, in particular systems for entering and storing location data and outputting navigation assistance information in a readily portable form for remote use.

DESCRIPTION OF THE RELATED ART

Mobile navigation systems are used to guide a traveler to a desired destination. Generally, these systems take advantage of global positioning system (GPS) receivers to note the location of the traveler. The location is often noted in longitude and latitude coordinates. The position of the traveler is compared to the desired destination, and visual and/or audio indications of current position, final destination, and/or specific directions for travel are provided. Thus, the traveler would enter the desired destination address and be provided navigation assistance to the ultimate destination. Examples of navigation systems and components are described in U.S. Pat. Nos. 5,596,500, 5,243,529, 5,544,061, 6,088,648, and 5,654,908, all of which are incorporated by reference as if reproduced in full below.

For example, a NavMate® navigation system, available from Visteon Technologies, LLC of Sunnyvale, Calif., provides navigation assistance in response to entry of a destination, which may be designated by street addresses, intersections, points of interest, or freeway entrances and/or exits. The NavMate® navigation system has the capability of referencing longitude and latitude information to a point on a map. Entry of destination information can take several minutes per destination.

Individuals or organizations that require travel to numerous and varying destinations on a regular basis, such as delivery fleet operators, have a continuous need for systems to receive and store destination information and to provide navigation assistance to each destination. For example, a pizza delivery service or courier service receives and then must provide its delivery persons with information about numerous delivery destinations, each matched to a particular item or items to be delivered. Frequently the destination and order information is provided to a central location or hub, where delivery drivers can collect the items to be shipped along with their corresponding destination information. Some delivery fleet operators possess geographic information systems (GIS) software that can determine highly accurate longitude and latitude or other map coordinates for a delivery destination, and maintains that information on a database. However, the delivery fleet operators often lack in-vehicle navigation systems to efficiently and accurately guide them to a desired destination. The fleet operators could gain efficiency if the GIS software could communicate GIS navigation information to an on-board navigation system.

In the aforementioned U.S. Pat. No. 5,654,908, to Yokoyama, an electronic diary is used to store a list of destinations and other customer information and has a navigation destination data output transmitter. When a user specifies a customer, the electronic diary retrieves the address or other information linked to the customer, and the user can enter a command to transmit the destination data to a portable navigation apparatus via a wireless system. The portable navigation apparatus can then provide information to assist the traveler to reach the desired destination. The Yokoyama system requires that the user have the information preprogrammed into the electronic diary, and requires a transmitter to transmit the data and a receiver to receive the data. The user must also be familiar with operation of the electronic diary. Since the data is transmitted via a wireless system, there is an increased risk of interception. Both the transmitter and receiver must be functioning to work together. Further, the electronic diary can be lost or stolen, creating both a security risk and an expensive device replacement need. Since each user requires an electronic diary and receiver, costs proportionately increase with the number of units needed.

Some package delivery companies utilize a system of preprinted forms containing a document serial number. The document serial numbers are generally sequentially incremented. Users enter data, such as name and address of the sender and the recipient on the forms, which are then attached to the package or packages to be shipped. The recipient and sender information is then entered into a database and indexed against the serial number on the corresponding tracking document. Frequently, the serial number of the tracking document is translated into an electro-optically and/or electromagnetically readable glyph. A glyph is a two-dimensional symbolic representation of information, such as conventional barcodes seen on groceries, or can be a three-dimensional holographic image. To track a package, the serial number can be provided manually to a database operator, or the glyph can be scanned in via an optical scanner. The delivery person can utilize a navigation apparatus to find the recipient's location by manually entering the address information into the navigation system. Should a package get lost or stolen, or the address label fall off of the package, personal information, such as the name of a person living at a particular address, can be revealed to third parties.

Thus, there remains a need for an improved system for securely, simply, and inexpensively receiving and storing location information and transmitting navigation information to multiple parties for numerous and varying destinations.

BRIEF SUMMARY OF THE INVENTION

In an embodiment of the present invention, a system for entering and storing location data, and securely outputting navigation assistance information to desired destinations is provided. A data input storage and processing device is provided into which destination information can be entered. The processor of the processing device matches address data to longitude and latitude coordinates, and converts this information into a glyph, such as a bar code, which can be printed out, and adhered to a package to be delivered. A delivery person, utilizing a portable glyph digitizer, such as a portable optical scanner (also referred to as an electro-optical scanner), can convert the glyph to a digital signal that is transmitted to a portable navigation system. A portable navigation system can provide direction to the ultimate destination based on digitized information translated from the glyph. Since all of the necessary destination information is in glyph form, which can be encoded to prevent recipient information from being revealed to unauthorized parties, transmission of delivery information is made more efficient and more secure. The cost of the glyph imprinted on paper, cardboard, or more durable or weather-resistant material, is insignificant versus the cost of portable electronic data storage devices, such as electronic diaries. Further, the glyph is easy to use, requiring only that the user move the scanner past the glyph or aim the scanner at the glyph.

In the system of the present invention, a glyph is uniquely created to indicate a desired destination. Since the destination data can be entered into a large fixed processing unit, with high operating speeds, the conversion of a destination address to a specific longitude and latitude or other navigational coordinates, can be done quickly. The longitude and latitude can then be output in glyph form and matched to the package or packages to be delivered. The glyph can be matched to the package by taping, stapling, binding, or other conventional technique of or device for matching a printed symbol with a package.

The present invention permits use of less powerful and less expensive portable navigation systems, as only longitude and latitude or other navigation coordinates need to be provided to the remote or mobile navigation system, and the decoded or translated coordinates can be quickly matched to particular map coordinates. By use of the systems and methods of the present invention, the total time and cost required to make a delivery is reduced.

It is to be understood that both the preceding summary and the detailed description that follows are intended merely to be exemplary and to further explain the invention claimed. The invention may be better understood by reference to the following detailed description read in conjunction with the accompanying drawings.

DETAILED DESCRIPTION OF THE INVENTION

Figure 1:
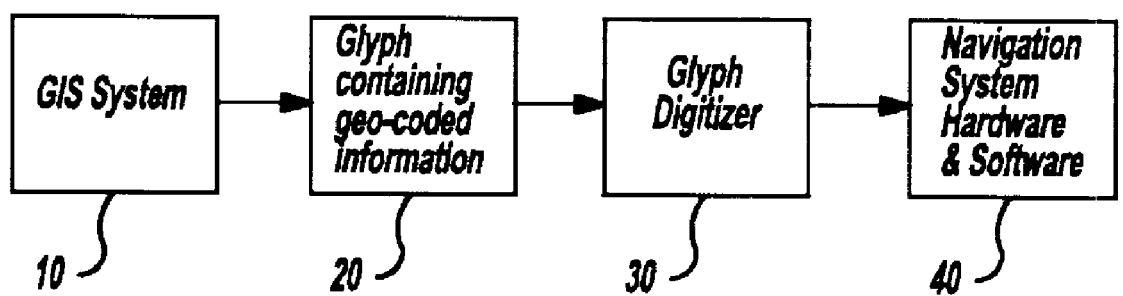
FIG. 1 is a block diagram flow chart showing the flow of address information from a geographic information system (GIS) of the present invention into which destination information has been entered to a portable navigation system.

An embodiment of the present invention may be better understood with reference to FIG. 1. Many delivery companies have a geographic information system (GIS) in their central location or "hubs". A GIS can reference the location of a destination to specific geographic longitude and latitude coordinates. Some systems may also use unique coordinates indexed to particular maps and navigation systems. In an embodiment of the present invention, a GIS system 10 is provided with hardware and software for converting address information, such as pick-up or destination location, to a glyph 20. For a package delivery service for example, depending on the needs of the delivery person, only the specific address of the recipient in latitude and longitude coordinates may be encoded, or the longitude and latitude and other information may be provided. Where longitude and latitude are not specific enough to direct the navigation system to the particular address of the recipient, i.e., in a multi-story apartment building or office or college building campus, it may be necessary to include additional location or descriptive information, such as a contact name, phone number, alphanumeric street address, an apartment number, building location within a building campus, side of a street, other identifying indicia such as a building description, or geographic landmarks. The glyph containing geo-coded information is then matched with an item to be delivered and provided to the delivery person.

The delivery person can then utilize a glyph digitizer 30, such as a portable optical scanner, to translate the glyph into a digital signal, which is then input into a mobile or remote navigation system 40, which comprises hardware for storing, processing, and outputting information. The navigation system has operating software and/or firmware for use therewith to process navigation and other information.

Figure 2:
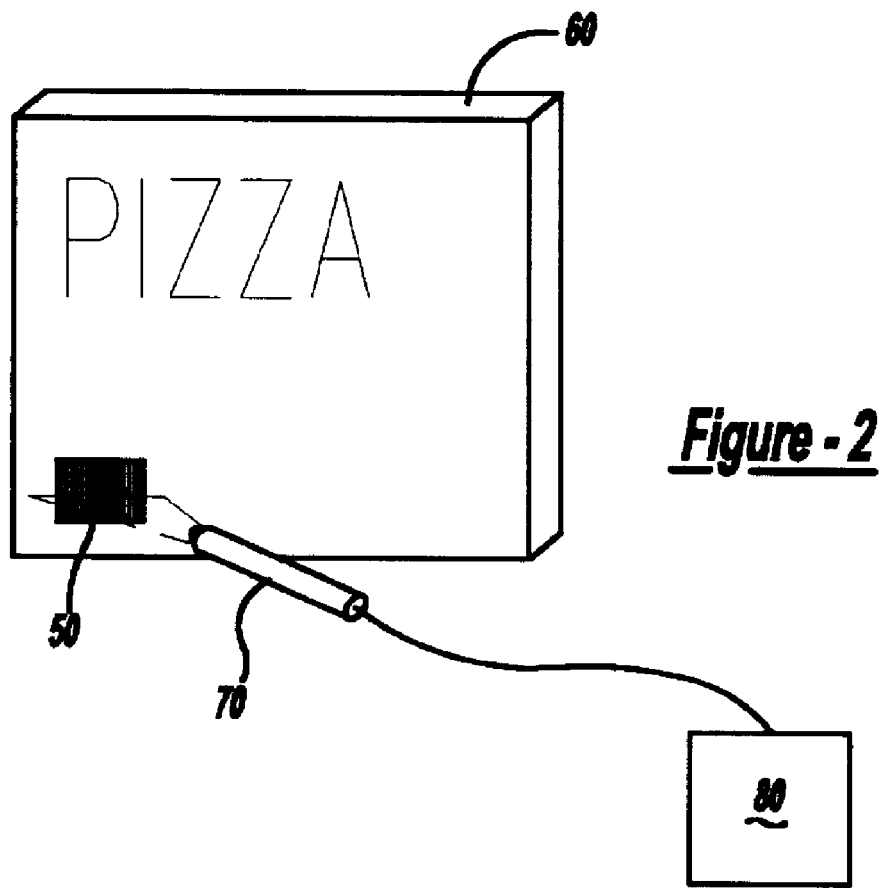
FIG. 2 illustrates a glyph on a package to be delivered, and a device for optically reading and digitizing the information contained in the glyph and for transmitting it to a navigation system.

With reference to FIG. 2, an illustration of a product utilizing a barcode glyph to indicate destination address is provided. In this example, a customer may provide order information by telephone, facsimile, email or other means to an order taker. The order taker enters the desired information into a GIS system of the present invention, which converts the destination address to a glyph containing geo-coded information. Information may also be transferred electronically to the GIS system of the present invention, eliminating the need for a human order taker. For example, orders may be transmitted via the internet.

Referring again to FIG. 2, the geo-coded information is output in the form of barcode glyph 50. Glyph 50 may be printed onto a self-adhesive label that may be adhered to the pizza box 60, or box 60 may be run through a printer so that the glyph is directly printed thereon. A delivery driver may then be provided one or more boxes of pizza, each of which may have a different glyph. A glyph digitizer 70 is connected to navigating system 80, the digitizer 70 and/or navigation system 80 can be carried by the delivery person or permanently connected into the delivery person's vehicle.

Figure 3:
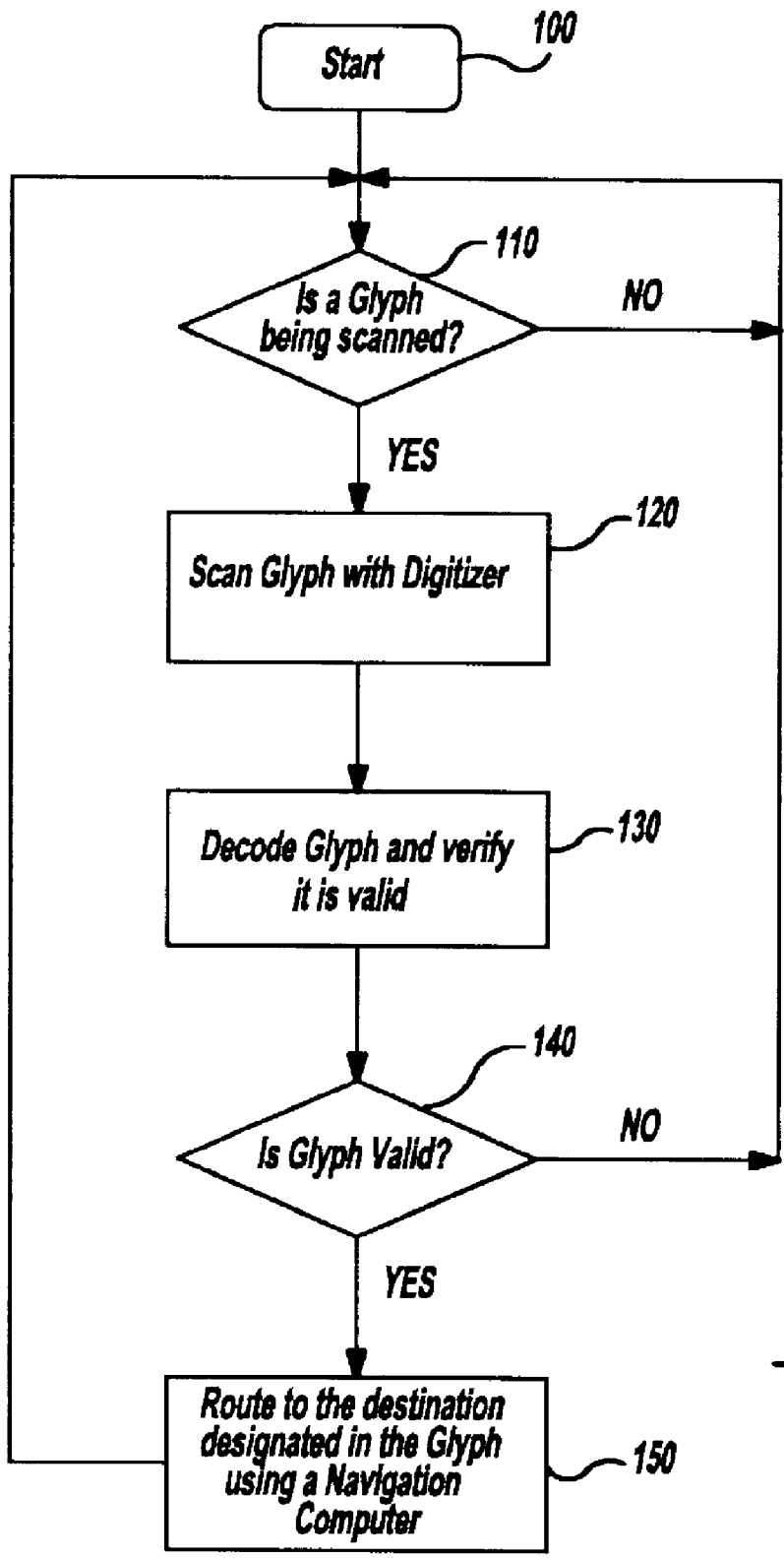
FIG. 3 is a flow chart of a routine for inputting a destination into a navigation device via a printed glyph.

With reference to FIG. 3, a flow chart is illustrated for a software program routine to input information from a digitized glyph into a navigation device. The routine is started when a start command is received, shown as block 100 in FIG. 3. The start command may be in response to a mechanical switch, in response to movement of the scanner, to pressure on the scanner input, or other desired start indicator. After initiating the routine, a subroutine 110 is run to determine whether a glyph is being read. If not, the routine may need to be reinitiated, depending on the device and routine selected. If a glyph is being scanned, the routine provides for digitizing the glyph as it is scanned in subroutine 120, followed by decoding and validation subroutines 130 and 140. If the glyph is not valid, the routine may need to be reinitiated, depending on the device and routine selected. If the glyph is valid, the processor subroutine 150 is run to convert the digitized information from the glyph to a set of navigational instructions and/or coordinates.

Non-limiting examples of commercially available equipment for use with the present invention include the NavMate® 2.0 and 2.1 navigation systems from Visteon Technologies, LLC. Since the NavMate® navigation systems possess an RS-232 port, a bar code reader with RS-232 readout can be used. For example, a model MT205/605 reader available from Marson Technology Co., LTD of Taipei, Taiwan can be used having the specifications in Table I below.

Figure 4:
FIG. 4 provides an example of a Code 128 bar code and a Code 39 bar code.
Figure 4:

Non-limiting examples of bar code formats include Code 128 and Code 39, illustrative examples of which are provided in FIG. 4. Examples of a preferred bar code formats are provided in Table II below.

TABLE I

TECHNICAL SPECIFICATIONS OF MODEL MT205/605 READER AVAILABLE FROM MARSON TECHNOLOGY CO., LTD

PERFORMANCE

| | |
|---|---|
| Light Source | 660 nm LED |
| Sensor | Photo Diode |
| Depth of Field | 1 mm |
| Resolution | 4 mil (0.1 mm) min. |
| PCS | 0.5 min. |
| Tilt Angle | 45 degrees |
| Scan Rate | 2.0 in. (50 mm) to 30 in. (750 mm)/sec. |

MECHANICAL/ELECTRICAL

| | |
|---|---|
| Dimensions | Length 5.9 in. (150 mm) |
| | Diameter 0.5 in. (13.5 mm) for 205 only |
| Weight | 170 g |
| Digital Output | Open Collector, Black = High level |
| Power Consumption | Working 65 mA for 605 @ 5 VDC ± 5% |
| | 35 mA for 205 |
| Cord | 6.9 ft. (2.1 m) Coiled |

ENVIRONMENTAL

| | |
|---|---|
| Temperature | Operating 32° F. to 122° F. (0° C. to 50° C.) |
| | Storage −4° F. to 140° F. (−20° C. to 60° C.) |
| Humidity | 0% to 95% (non-condensing) |
| Mechanical Shock | 5 ft (1.5 m) Drop onto Concrete Surface |
| ESD Protection | Functional after 15 KV discharge |
| Conformance | FCC Class A and CE |

INTERFACE

| | |
|---|---|
| Symbologies | UPC-E, A; EAN-8, 13; JAN; ISBN; all with supplement; Code 39; Interleave 2 of 5; Matrix 2 of 5; Industrial 2 of 5; Code 93; Codabar; Code 128; MSI/Plessey; BC-412; China Postal Code |
| Interface | PC-XT/AT; PS/2; Notebook PC; IBM 5550; PS-55; RS-232 |

TABLE II

BAR CODE FORMAT EXAMPLES

| | |
|---|---|
| SYMBOLOGIES: | Code 128, Code 39 |
| CONTENT: | |
| Geodetic reference system | World Geodetic System 1984 (WGS84) |
| Latitude/Longitude Resolution | Fifth Decimal Place (e.g., ##.#####) |
| Order reference characters | 10 character minimum, 25 preferred |
| Character set | Extended ASCII |
| Order | Latitude, longitude, order reference |

Exemplary software programs for use with the navigation system hardware include NavMate® Version 3.1.03 navigation system software, and exemplary map databases include the Q2 2000 map database. One preferred database is provided by Navagation Technologies, which is updated quarterly. Preferably, databases are used that are qualified to the standards of Visteon Technologies, LLC, of Sunnyvale, Calif. The software is modified in accordance with the present invention to perform as described herein.

In an exemplary embodiment, a user scans a bar code containing location information, and receives a feedback, such as an audible signal, that the bar code was read successfully. The feedback may come from the optical scanner. In response to the bar code input, the navigation system, for example, NavMate® navigation system, either provides a "Select Route Criteria" screen if the location coordinates were understandable and referenced to a location in the map database, or an error screen or other indicator indicates a problem and prompts the user to rescan the bar code. If a route criterion is selected, the system presents a "Calculating a Route to:" screen. In an embodiment, the system also presents a screen similar to a point of interest (POI) screen with:

a) Order reference from the bar code;
b) Street name for desired location; and/or
c) City and State for desired location.

Upon reaching the destination, the system can automatically provide other information on an "Arrival Screen," such as additional order information or instructions.

In another embodiment, where there are multiple packages to be delivered, the delivery person upon taking possession of the stack of packages to be delivered, can scan all of the glyphs into the navigation system, which can calculate and provide the optimum delivery path to minimize delivery time, and/or distance for all the packages. In an alternative embodiment, the main operating system associated with the GIS system of the present invention can optimize a route and organize the packages in the optimum sequence for each delivery person, such that the delivery person will deliver package #1 first, #2 second, #3 third, etc. Thus, customized routes with optimized delivery times and/or distances would be devised for each set of deliveries. This would also reduce fuel consumption.

It is envisioned that this system can be utilized for all types of delivery systems and transportation systems. For example, any type of document or package may be delivered, or picked up, by use of the system. Bus and cab drivers may likewise utilize the system. For example, an airport courier navigation system constructed in accordance with the present invention can receive, store and process customer addresses and pick up times for customers desiring to be picked up to be brought to the airport. A single sheet of paper can be handed to the delivery driver on which is printed a series of glyphs, the sequence of which has been optimized to minimize the delivery time and/or distance for all of the passengers to each of their desired destination addresses. Thus, removing any necessity for the driver and/or fare to communicate in a specific language the desired destination. The pick-up times may also be encoded. Thus, the delivery driver would scan in the first glyph on the list, and the system would then direct the driver to that address. The system may also provide that, once a barcode has been scanned and the desired address reached, that barcode would no longer activate the system until it was reinitiated. Likewise, if the driver skipped a barcode on the sheet, the system would recognize that it is out of sequence and prompt the driver to scan the appropriate barcode. Alternatively, all of the bar codes would be scanned into the navigation system, and the system would then direct the drivers to the various destinations in an optimized sequence. Where pick-up times are included in the optimization routine, the system can adjust the route by matching time to location.

In another embodiment, passengers leaving a bus station, airport terminal or other starting point enter their destination information into a location information and processing system of the present invention, which prints out a ticket that includes their address information in glyph form. The glyph form ticket would not reveal address information to outsiders, and would eliminate the need for each passenger to give the driver their address information. The driver can scan in all of the tickets, and an onboard navigation system can optimize the delivery route, thereby saving time for all of the passengers and increasing the efficiency of the delivery vehicle. A kiosk may also generate an optimized delivery route, printed out in glyph form, which the driver can utilize.

It is also envisioned that the system and methods of the present invention can be used to deliver highly sensitive and confidential information, such as medical records and legal documents. The bar codes may be encrypted so that they are readable by authorized devices and parties only. Internal office or organizational mail can also be routed via the systems and methods of the present invention to facilitate transfer and improve security.

Thus, a system has been disclosed for entering and storing location information and for providing navigational information to facilitate travel to desired locations, comprising a device for receiving location information, a processor for converting received location information to a glyph, and an output for providing instructions for generating a glyph containing location information. The processor may convert location information to longitude and latitude coordinates, and the coordinates are translated for generation of an optically readable glyph. A glyph generated by the system and output onto an optically or electromagnetically readable form on a transportable medium may be encrypted so that it may only be digitized and converted to the desired destination latitude and longitude by an authorized device.

A destination information device has also been disclosed, which comprises a tangible medium imprinted with an optically readable glyph that contains information that can be optically read and converted to digital form, and the digital form can be processed by a navigation system to provide navigation assistance information to a desired location. The destination information device may be a passenger travel ticket, or a label for a package. In an embodiment, a pizza delivery box with a location glyph adhered or imprinted thereon has been disclosed.

While embodiments of the present invention have been disclosed as examples herein, there could be a wide range of changes made to these embodiments without departing from the present invention. Thus, it is intended that the foregoing detailed description be regarded as illustrative rather than limiting and that it be understood that it is the following claims, including all equivalents, which are intended to define the scope of the invention.

What is claimed is:

1. A system for entering and storing location information and for providing navigational information to facilitate travel to desired locations, comprising a device for receiving location information, a processor for converting received location information to glyph, and an output for providing instructions for generating a glyph containing location information, wherein said location information comprises at least one member selected from the group consisting of a street address, an intersection name, a point of interest name, a room number, a contact name, a phone number, a building location within a building campus, a geographic landmark name, a building description, and a freeway entrance or exit name.

2. The system of claim 1, wherein said processor converts location information to longitude and latitude coordinates, and said coordinates are translated for generation of an optically readable glyph.

3. The system of claim 2, wherein a glyph generated by said system and output onto an optically or electromagnetically readable form on a transportable medium is encrypted so that it may only be digitized and converted to the desired destination latitude and longitude by an authorized device.

4. The system of claim 1, wherein said system can generate multiple glyphs for multiple destinations, and can optimize a route for delivering passengers or packages to said varying destinations, and wherein said route can be optimized for at least one of the group consisting of distance, and time of delivery.

5. A destination information device, comprising a tangible medium imprinted with an optically readable glyph, wherein said glyph contains location information that can be optically read and converted to digital form, and said digital form can be processed by a navigation system to provide navigation assistance information to a desired location, wherein said location information comprises at least one member selected from the group consisting of a street address, an intersection name, a point of interest name, a room number, a contact name, a phone number, a building location within a building campus, a geographic landmark name, a building description, and a freeway entrance or exit name.

6. The device of claim 5, wherein said glyph is a barcode.

7. The device of claim 5, wherein said glyph is applied to a package to be delivered to a desired location.

8. The device of claim 5, wherein said glyph is applied to a passenger ticket, wherein a passenger may utilize said ticket to provide destination information to a transportation service.

9. The device of claim 5, wherein said glyph is applied to one of the group consisting of a pizza box, and a courier package.

10. A method for providing navigational information to facilitate travel to a desired location, comprising the steps of converting location information into geographic coordinates and outputting said geographical coordinates in the form of a glyph, wherein said location information comprises at least one member selected from the group consisting of a street address, an intersection name, a point of interest name, a room number, a contact name, a phone number, a building location within a building campus, a geographic landmark name, a building description, and a freeway entrance or exit name.

11. The method of claim 10, wherein said glyph can be digitized by a portable glyph digitizer and input to a navigation system to provide a traveler with navigation assistance to the desired location.

12. The method of claim 10, wherein said glyph is readable by at least one of the group consisting of an optical reader and an electromagnetic reader.

13. The method of claim 10, wherein said geographical coordinates are longitude and latitude coordinates.

14. The method of claim 13, wherein said glyph is a barcode.

15. The method of claim 13, further comprising the step of converting descriptive information for a desired location into digital form, and outputting said descriptive information in the form of a glyph.

16. The method of claim 10, wherein said glyph is a barcode.

17. A system for entering and storing location information and for providing navigational information to facilitate travel to desired locations,comprising a device for receiving location information, a processor for converting received location information to a glyph, and an output for providing instructions for generating a glyph containing location information, wherein said processor converts location information to longitude and latitude coordinates, and said coordinates are translated for generation of an optically readable glyph, wherein a glyph generated by said system and output onto an optically or electromagnetically readable form on a transportable medium is encrypted so that it may only be digitized and converted to the desired destination latitude and longitude by an authorized device.

18. A system for entering and storing location information and for providing navigational information to facilitate travel to desired locations, comprising a device for receiving location information, a processor for converting received location information to a glyph, and an output for providing instructions for generating a glyph containing location information, wherein said system can generate multiple glyphs for multiple destinations, and can optimize a route for delivering passengers or packages to said varying destinations, and wherein said route can be optimized for at least one of the group consisting of distance, and time of delivery.

19. A destination information device, comprising a tangible medium imprinted with an optically readable glyph, wherein said glyph contains information that can be optically read and converted to digital form, and said digital form can be processed by a navigation system to provide navigation assistance information to a desired location, wherein said glyph is applied to a passenger ticket, wherein a passenger may utilize said ticket to provide destination information to a transportation service.

20. A destination information device, comprising a tangible medium imprinted with an optically readable glyph, wherein said glyph contains location information that can be optically read and converted to digital form, and said digital form can be processed by a navigation system to provide navigation assistance information to a desired location, wherein said glyph is applied to one of the group consisting of a pizza box, and a courier package.

21. A method for providing navigational information to facilitate travel to a desired location, comprising the steps of converting location information into geographic coordinates and outputting said geographical coordinates in the form of a glyph, wherein said glyph can be digitized by a portable glyph digitizer and input to a navigation system to provide a traveler with navigation assistance to the desired location.

* * * * *